United States Patent [19]

Stahl

[11] Patent Number: 5,291,545

[45] Date of Patent: Mar. 1, 1994

[54] APPARATUS AND METHOD FOR DETERMINING THE STATE OF A TELEPHONE LINE

[75] Inventor: Karl-Erik Stahl, Varmdo, Sweden

[73] Assignee: Intertex Data AB, Sundbyberg, Sweden

[21] Appl. No.: 882,004

[22] Filed: May 13, 1992

Related U.S. Application Data

[63] Continuation-in-part of Ser. No. 591,940, Oct. 1, 1990, Pat. No. 5,140,631.

[51] Int. Cl.$^5$ .................. H04M 11/00; H04M 3/22
[52] U.S. Cl. .................................. 379/98; 379/377; 379/379
[58] Field of Search .............. 379/92, 93, 106, 107, 379/274, 277, 331, 373, 377–382, 394, 398, 412–414, 437, 97, 98, 99

[56] References Cited

U.S. PATENT DOCUMENTS

| | | |
|---|---|---|
| 4,220,825 | 9/1980 | Fahey . |
| 4,224,478 | 9/1980 | Fahey et al. . |
| 4,433,212 | 2/1984 | Moses et al. . |
| 4,647,723 | 3/1987 | Voorhies ........................ 379/381 |
| 4,679,229 | 7/1987 | Yamaguchi ..................... 379/373 |
| 4,845,741 | 7/1989 | Fourdraine ...................... 379/98 |
| 4,958,371 | 9/1990 | Damoci et al. ................. 379/377 |
| 4,987,586 | 1/1991 | Gross et al. ..................... 379/93 |
| 5,146,384 | 9/1992 | Markovic et al. ............... 379/412 |

OTHER PUBLICATIONS

General Electric Optoelectronics Manual, 1976 (pp. 70–72).

Primary Examiner—Wing F. Chan

[57] ABSTRACT

A detector for On-Hook/Off-Hook state of a telephone line includes a capacitor connected to the telephone line in series with a resistance large enough to be allowed as load on an On-Hook telephone line. A low impedance voltage sensing means in series with a normally open switch is connected across the capacitor, and the switch is closed in response to a polling signal to determine if the line is in On-Hook state. The capacitor transforms a very low charging current lasting seconds into a large discharge current lasting only milliseconds. This makes it possible to use an inexpensive low impedance voltage sensing device, such as an opto-coupler in series with a zener diode. Such components provide high-voltage galvanic insulation at low cost, and a very compact apparatus can be made. The invention also provides for inexpensive ring detector circuits and for overload protection for the equipment connected to the telephone line.

11 Claims, 3 Drawing Sheets

APPARATUS AND METHOD FOR DETERMINING THE STATE OF A TELEPHONE LINE

This application is a continuation-in-part of U.S. application Ser. No. 07/591,940, filed Oct. 1, 1990, now U.S. Pat. No. 5,140,631.

BACKGROUND OF THE INVENTION

The present invention relates to telephones, facsimile machines, computer modems, automatic alarm dialers, and similar equipment, and specifically to detection apparatus in such equipment for ascertaining whether a telephone line is in On-Hook or Off-Hook condition, whether there is a ring signal on the line, and whether the voltage on the line in Off-Hook condition is so high that there is risk for overheating of the connected electronic components.

A residential or business user might connect more than one device to one common telephone line. When one of the devices has an auto-dialing function, such as in a facsimile machine or a modem, problems will arise if the telephone line is in use (Off-Hook) when the automatic device attempts to dial a number. The automatic device thus should be able to detect whether the telephone is Off-Hook or On-Hook before dialing is attempted. Many telephone authorities will not allow the use of automatic dialing equipment on their lines unless they contain line state detectors that block dialing attempts when the line is Off-Hook.

A telephone line in On-Hook condition has no current flow, and the line voltage is high, typically 50 V DC. A telephone line in Off-Hook condition sees a current consumption of 10-50 mA DC, and the line voltage is low, about 1-10 V DC. The On-hook/Off-hook line state can thus be detected either by sensing the current in the line, or by sensing the line voltage.

Most of the presently used devices for detecting the On-Hook/Off-Hook state of a telephone line rely on sensing the current in the telephone line, usually by connecting a relay directly in series with the telephone wires. The relay coil must have low resistance, typically max 20 ohm, in order not to cause too much voltage drop in the line, and the relay must close at a current of 10 mA DC or less in the coil. The relay coil must also be shunted by a large bipolar capacitor, typically about 50 μF, to avoid attenuation of high frequency signals. Some telephone authorities specify that the relay must have two coils, each with a shunt capacitor, in order to maintain symmetry on the telephone line. This known detector circuit works well, but the components are expensive and bulky.

The current in the telephone line could also be sensed by means of an opto-coupler instead of a relay, but this introduces a constant voltage threshold of about 1 V in the telephone line, which is not acceptable to many telephone companies, so this method is rarely used.

A detector for On-Hook/Off-Hook state of a telephone line can also be based on sensing of the line voltage instead of line current. Known voltage sensing devices for detection of the On-Hook/Off-Hook state of a telephone line have not been competitive, because telephone authorities require high voltage galvanic insulation from the telephone line, and extremely low loading of the telephone line in On-Hook state. Most of the known devices using voltage sensing are accordingly expensive and bulky.

U.S. Pat. No. 4,647,723 describes a voltage sensing detector for the On-Hook/Off-Hook state of a telephone line. This device needs an amplifier in the voltage sensing circuit, because the low current loading allowed by the telephone authorities on an Off-Hook telephone line can not directly drive an output device providing galvanic separation. The amplifier needs power, which must be galvanically separated from all circuits outside the voltage sensing circuit, so a battery is included as a power source. This makes this detector complicated and expensive, and the battery is a bulky and an inconvenient component.

U.S. Pat. No. 4,220,825 describes another voltage sensing detector for On-Hook/Off-Hook state of a telephone line. This device includes a capacitor in series with a resistor connected across the telephone line via contacts on a relay, so the capacitor is charged to the line voltage. In response to a polling signal, the capacitor, still in series with the resistor, is switched by the relay from the telephone line to the input of a voltage sensing device, and the voltage sensing device determines if the capacitor voltage corresponds to On-Hook or Off-Hook line state. By switching the capacitor/resistor combination between the telephone line and the voltage sensor, the insulation resistance in the relay contacts provide galvanic insulation between the line and the voltage sensor, so there is no problem in providing power to the voltage sensor. But the resistor in series with the capacitor must be low compared to the input resistance of the voltage sensing device, so the resistance can not be large enough to satisfy the loading restrictions imposed by many telephone companies. The galvanic insulation between relay contacts is seldom more than a few hundred volts, which is far below the requirement for several kV insulation by most telephone authorities. Fulfilling this requirement would be impractical with the design described in this reference.

U.S. Pat. No. 4,958,371 describes still another voltage sensing detector for On-Hook/Off-Hook state of a telephone line. This device uses the input circuit of an opto-coupler in series with a zener diode to measure the voltage on the telephone line in response to a polling signal. The opto-coupler provides the required galvanic insulation between the telephone line and the rest of the telephone equipment. The input circuit of an opto-coupler has essentially zero resistance, so this detector will load the telephone line heavily if the line voltage is larger than the zener voltage when the line is polled, which is the indication that the line was in On-Hook state before polling. Such a heavy loading on an On-Hook telephone line is not allowed by telephone authorities, so monitoring the line state with this device will violate their specifications.

SUMMARY OF THE INVENTION

The main object of the invention is to provide an apparatus for determining the On-Hook/Off-Hook state of a telephone line that meets the most strict requirements imposed by telephone authorities for insulation and line loading, and yet is reliable, inexpensive, and extremely compact.

It is a further object of the invention to provide a very compact, reliable and inexpensive apparatus for determining both the On-Hook/Off-Hook state of a telephone line, the ringing state of an On-Hook telephone line, and an overload state on an Off-Hook telephone line.

These objects are achieved according to the invention by an apparatus for determining the state of a telephone line which comprises a voltage sensing device having a low resistance input circuit, a capacitor in series with a resistor connected across the telephone line, the resistor having a resistance large enough to be acceptable for loading of an On-Hook telephone line, and means for discharging the capacitor across the input circuit of the voltage sensing device in response to a polling signal. In a preferred form of the invention, the voltage sensing device comprises an opto-coupler with a zener diode in series with its control terminals.

The invention further provides for a related method of determining the state of the telephone line.

DESCRIPTION OF PREFERRED EMBODIMENTS OF THE INVENTION

Figure 1:
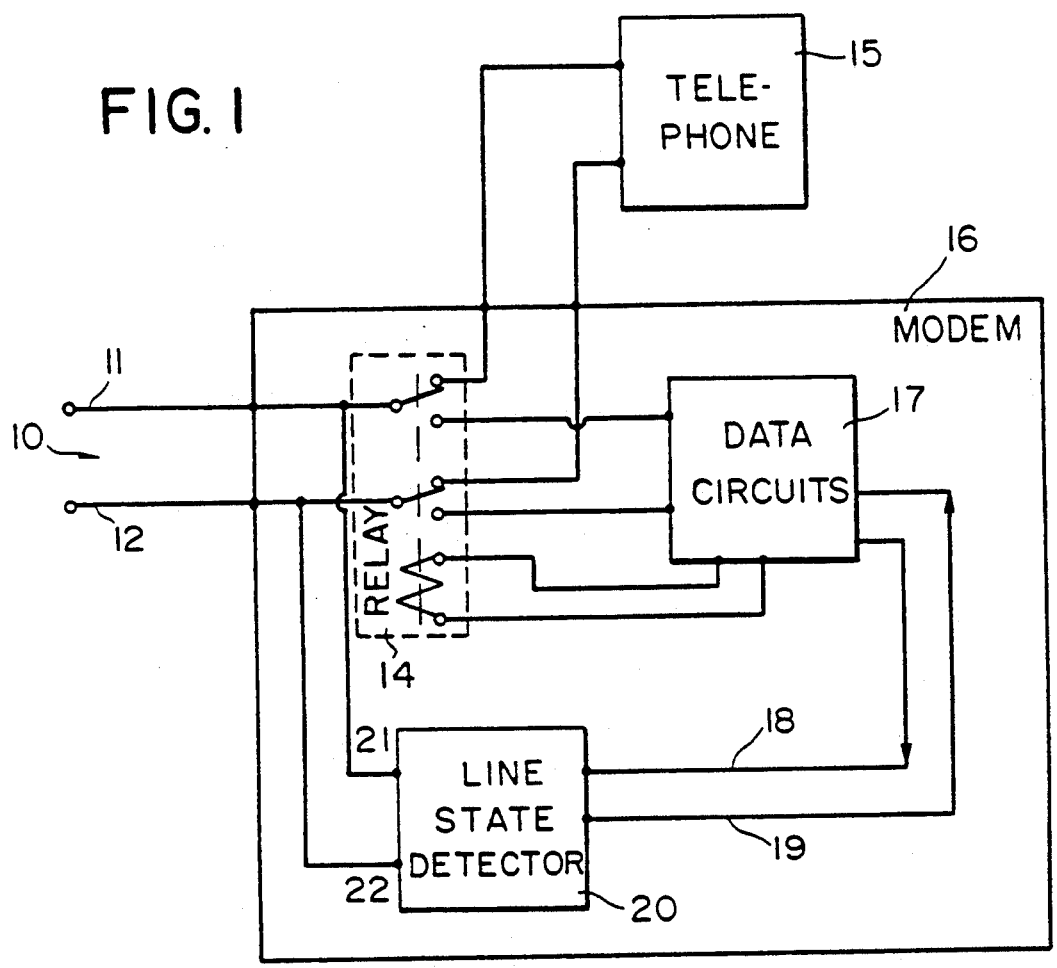
FIG. 1 is a block diagram of a telephone installation with a telephone and a modem with an apparatus for determining the state of a telephone line according to the invention connected to a telephone line.

FIG. 1 shows a modem 16 and a telephone 15 connected to a common telephone line 10. Both the telephone 15 and the data circuits 17 in the modem 16 are connected to the wires 11 and 12 of the telephone line 10 via contacts in a relay 14, which is shown as part of the modem device 16. The telephone line 10 is connected to the telephone 15 when the relay 14 is inactive, and to the data circuits 17 in modem 16 when the coil of relay 14 is energized. Contacts in relay 14 serve as Off-Hook switch for modem 16.

The data circuits 17 usually include a microprocessor with associated memory for control of the modem and the state of relay 14, as well as a line transformer and other data transmission components. When the modem 16 is activated for dialing, the data circuits 17 first check if the telephone line 10 is available by polling the line state detector 20 via polling channel 18 and response channel 19. If the line 10 is in On-Hook condition, the data circuits 17 energize relay 14 and switches the modem to Off-Hook state. Thereafter automatic dialing starts. If the telephone line 10 is in use, modem 16 waits for the line to become available before relay 14 is energized and dialing starts.

The line state detector 20 is shown with two terminals 21, 22 connected to wires 11, 12 in the telephone line 10. The line state detector 20 senses the voltage on the line 10, which is sufficient for a line state detector according to the invention. If a conventional line state detector based on relay coils in series with wires 11 and 12 were to be used, at least one of the wires 11, 12 would have to pass through the line state detector 20.

Figure 2:
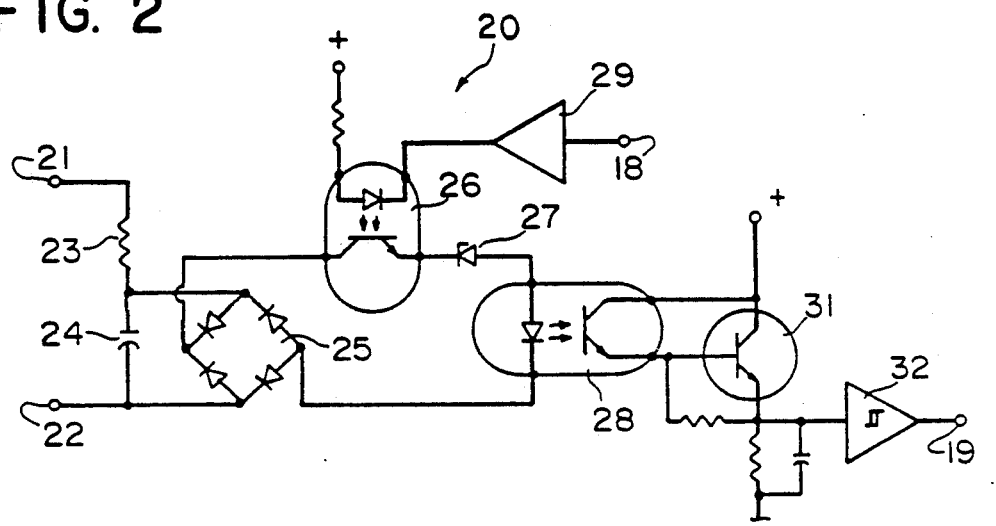
FIG. 2 is a circuit diagram for a first preferred embodiment of an apparatus for determining the On-Hook/Off-Hook state of a telephone line according to the invention.

A circuit diagram for a line state detector 20 according to the invention for determining the On-Hook/Off-Hook state of the telephone line is shown in FIG. 2. A bipolar capacitor 24 of about 0.1 $\mu$F capacitance is connected to terminals 21 and 22 in series with a resistor 23 having a resistance in the order of 5 Mohm. Terminals 21, 22 are connected to the wires 11 and 12 of the telephone line 10 as shown in FIG. 1. The AC terminals of a rectifier bridge 25 is connected across capacitor 24, and the DC terminals of the rectifier bridge 25 is connected to a voltage sensing circuit consisting of a zener diode 27 with zener voltage about 20 V in series with the control terminals of an opto-coupler 28. The output terminals of a second opto-coupler 26, acting as a normally open switch, is connected in series with the voltage sensing circuit. The control terminals of opto-coupler 26 is connected to the data circuits 17 in modem 16 via a polling channel 18 and a buffer amplifier 29. The output terminals of opto-coupler 28 is connected to the data circuits 17 via buffer stages 31, 32 and a response channel 19.

Opto-couplers 26 and 28 provide the required galvanic separation of circuits connected to the telephone line 10. There are no amplifiers in the circuits connected to the telephone line, so no isolated power supplies or batteries are required.

When the modem 16 is in standby mode, no control current flows in the control circuit of opto-coupler 26, so its output circuit is normally open. Capacitor 24 accordingly has zero load current, so it will be charged via resistor 23 to the voltage between terminals 21 and 22, which is the same as the line voltage on the telephone line 10. The time constant of the charging circuit is about 0.5 second with the component data assumed above.

When the telephone 15 is On-Hook, the line voltage is about 50 volt, and the capacitor will be charged to more than 31 V within 0.5 second, and to near 50 V in a couple of seconds. If the telephone 15 is brought into Off-Hook state, the line voltage drops to about 10 V, and the voltage on capacitor 24 drops from 50 V to below 23 V in less than 0.6 second, and to about 10 V within a couple of seconds.

When modem 16 is activated, the data circuits 17 send a polling pulse via polling channel 18 to opto-coupler 26. This causes the output circuit of opto-coupler 26 to close, so the voltage sensing circuit is connected to the capacitor. The polarity of the voltage on capacitor 24 depends on the polarity of terminals 21, 22 in relation to wires 11, 12 in the telephone line 10, but the rectifier bridge 25 assures that the voltage after the bridge is opposed to the threshold voltage of the zener diode 27. The combined threshold voltage in zener diode 27, bridge diodes 25, and the control circuit of opto-coupler 28 effectively subtracts 23 V from the voltage on capacitor 24.

If line 10 is in On-Hook state when the data circuits 17 poll the line state detector 20 via polling channel 18, the capacitor 24 will be charged to about 50 V, which is much larger than the combined threshold voltage in the voltage sensing circuit, so the capacitor 24 will be discharged through the voltage sensing circuit. A large current surge will flow through the control circuit of opto-coupler 28, which has close to zero resistance, so the output circuit of opto-coupler 28 will close briefly, and a square pulse will be returned to the data circuits 17 via buffer amplifiers 31, 32 and response channel 19.

If, on the other hand, line 10 is in Off-Hook state when the line state detector 20 is polled via polling channel 18, the combined threshold voltage in the discharge circuit of the capacitor 24 is larger than the voltage on line 10, so no current will flow in the control circuit of opto-coupler 28, and no pulse will be returned via response channel 19.

The data circuits 17 are programmed to accept a pulse returned on response channel 19 when the line state detector 20 is polled via polling channel 18 as indication that the line is On-Hook. Only when such a response is received by the data circuits 17 will the data circuits close relay 14 and start dialing. This happens only when the line 10 is in On-Hook condition, so relay 14 will be closed only when telephone 15 is not in use.

Telephone authorities have strict limits on the load that is allowed on a telephone line in On-Hook state. A typical requirement is today 5 Mohm or larger resistance load. Somewhat lower resistance is allowed by a few telephone authorities, and some specify a maximum current load, in the order of a few microampere. The load on the telephone line 10 by the line state detector shown in FIG. 2 is always limited by the resistance of resistor 23, which can be as large as the any telephone authority may specify, so the strictest requirements can be met. A resistance value of 5 Mohm will satisfy most telephone authorities today. Smaller resistance values for resistor 23 can be used in areas where telephone authorities allow this.

It should be noted that the loading limits assume constant loading, while the loading imposed on a telephone line 10 by the detector circuit shown in FIG. 2 is transient. The time constant for the preferred circuit (0.1 microfarad and 5 Mohm) is 0.5 second, so capacitor 24 will quickly be charged to the full line voltage, and thereafter the current drain on the telephone line is zero. Only while the line state detector 20 is polled via polling channel 18, so opto-coupler 26 is closed, does the resistance load on line 10 fall to the resistance value of resistor 23. Today telephone authorities do not make allowance for transient loading, but that may change as detectors according to the present invention become common.

If the telephone line is in Off-Hook state when the line state detector 20 is polled, the line current is already more than 10 mA, so a few $\mu$A extra load from the resistor/capacitor circuit would be unimportant. In reality, no current flows in the line state detector 20 according to the invention in this case, however, because capacitor 24 is not discharged when opto-coupler 26 is closed when the line 10 is in Off-Hook state, as explained above.

There is no requirement on the length of the polling pulse. A continuous polling signal starting at polling and ending only when the modem goes On-Hook again is acceptable. When opto-coupler 26 closes, capacitor 24 discharges rapidly to a voltage equal to the threshold voltage in the discharge circuit. When this threshold voltage is reached, the discharge current drops to zero, so it does not matter if opto-coupler 26 remains closed.

A current large enough to be detected by inexpensive current sensing devices, such as opto-couplers, is obtained according the invention by testing a capacitor voltage derived from the voltage on the telephone line 10 momentarily instead of loading the telephone line continuously. The capacitor 24 transforms a very low current through a resistance 23 large enough to be allowable as load on an On-Hook telephone line over a time period measured in seconds to a much larger discharge current with a duration measured in milliseconds. This large discharge current can be detected directly by inexpensive sensors, such as opto-couplers, without need for amplification.

Figure 3:
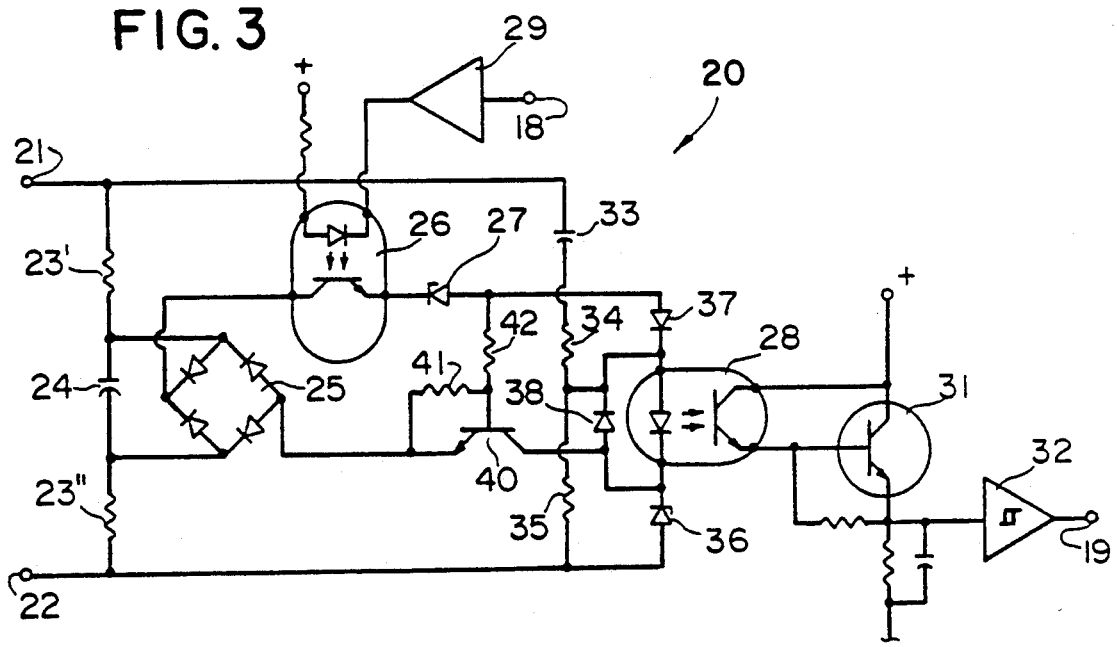
FIG. 3 is a circuit diagram for an apparatus for determining the On-Hook/Off-Hook state of a telephone line according to FIG. 2 combined with a ring detector circuit.

Modems usually are equipped to respond to incoming calls by closing relay 14 after a preset number of incoming ring signals. The ring signals are detected by a ring detector circuit. FIG. 3 shows a line state detector according to the invention including a ring detector circuit, which is combined with the On-Hook/Off-Hook detector described above.

In FIG. 3 all the components 23-32 of the line state detector shown in FIG. 2 are included, with unchanged functions, except that resistor 23 is split into two series connected parts 23' and 23" to avoid risk for discharge of capacitor 24 through zener diode 36 when the On-Hook/Off-Hook detector is polled in cases when terminal 22 has a positive voltage relative terminal 21. Diode 37 and transistor 40 are added to avoid risk for discharge of capacitor 24 through resistor 23" and zener diode 36 between poll signals in cases when terminal 22 has a positive voltage relative terminal 21.

When the data circuits 17 send a polling signal via the polling channel 18 to opto-coupler 26, the output circuit of opto-coupler 26 closes, which opens a discharge circuit for capacitor 24, as explained in connection with FIG. 2. If line 10 is On-Hook when the polling is made, the voltage on capacitor 24 is larger than the combined threshold voltage in the discharge circuit, and a small current flows through resistors 42 and 41, so transistor 40 closes. This completes the discharge circuit from capacitor 24 through the control circuit of opto-coupler 28, and a square pulse is returned to the data circuits 17 via response channel 19, exactly as in the circuit of FIG. 2. The data circuits are programmed to recognize a pulse on response channel 19 following immediately after the polling signal as confirmation that the line is On-Hook, and the Off-Hook relay 14 is closed by the data circuits 17, as explained above. If, on the other hand, line 10 is in Off-Hook state when polling is made, no signal is returned via response channel 19, and the modem waits.

Ring signals are AC signals on the telephone line. The AC ring signals are passed via capacitor 33 to a voltage divider comprising resistors 34 and 35. The output from the voltage divider 34, 35 is fed to the control terminals of opto-coupler 28 in series with a zener diode 36. Diode 38 serves as a bypass for the control terminals of opto-coupler 28 during negative half-waves of the ring signal. The voltage divider 34, 35 and the zener diode 36 block noise signals on the line 10, so they do not affect the control circuit of the opto-coupler 28, but genuine ring signals cause the opto-coupler 28 to close intermittently, so trains of square voltage pulses are transmitted to the data circuits 17 in the modem via response channel 19. The data circuits 17 are programmed to recognize pulse trains on response channel 19 as ring signals, and the fact that these signals are received even though no polling pulse was sent via the polling channel 18 further confirms these signals as ring signals.

In the circuit of FIG. 3, one opto-coupler 28 serves as detector of both line state and ring signals, which simplifies the circuits and lowers the cost of the circuits. The ring detector by itself is, however, not part of the present invention. The data circuits 17 will respond in known ways to the ring signals. The response to ring signals is not part of the invention, so further details are not required here.

It should be noted, that the bridge rectifier 25 in FIGS. 2 and 3 is required only when components 26, 27 and 28 are polarity dependent, such as the simple opto-couplers 26, 28 and the single zener diode 27 shown. Polarity dependent components are not required by the invention. The opto-coupler 26 can for instance be replaced by a relay, the zener diode 27 can be bipolar, and opto-coupler 28 can be replaced by any known current detector with a bipolar control circuit. If such components are used in the voltage sensing circuit, no bridge rectifier 25 is needed in a line state detector according to the invention.

Some countries have standards for modem devices requiring safety testing at line voltages far above normal Off-Hook line voltage. Such high line voltages cause excessive heating in components of the modem device 16, unless the components are used well below their ratings at normal line voltages. A modem device designed to work at the high safety test voltages thus tend to become expensive and relatively bulky.

One way to avoid this extra cost and bulk is to provide a means for detecting when the line voltage is so high that there is risk for overheating of components in the modem device 16, and to open the Off-Hook relay 14 or Off-Hook switch 14' when an overload state is indicated, so the modem device 16 is protected from long term exposure to the overload voltage.

Figure 4:
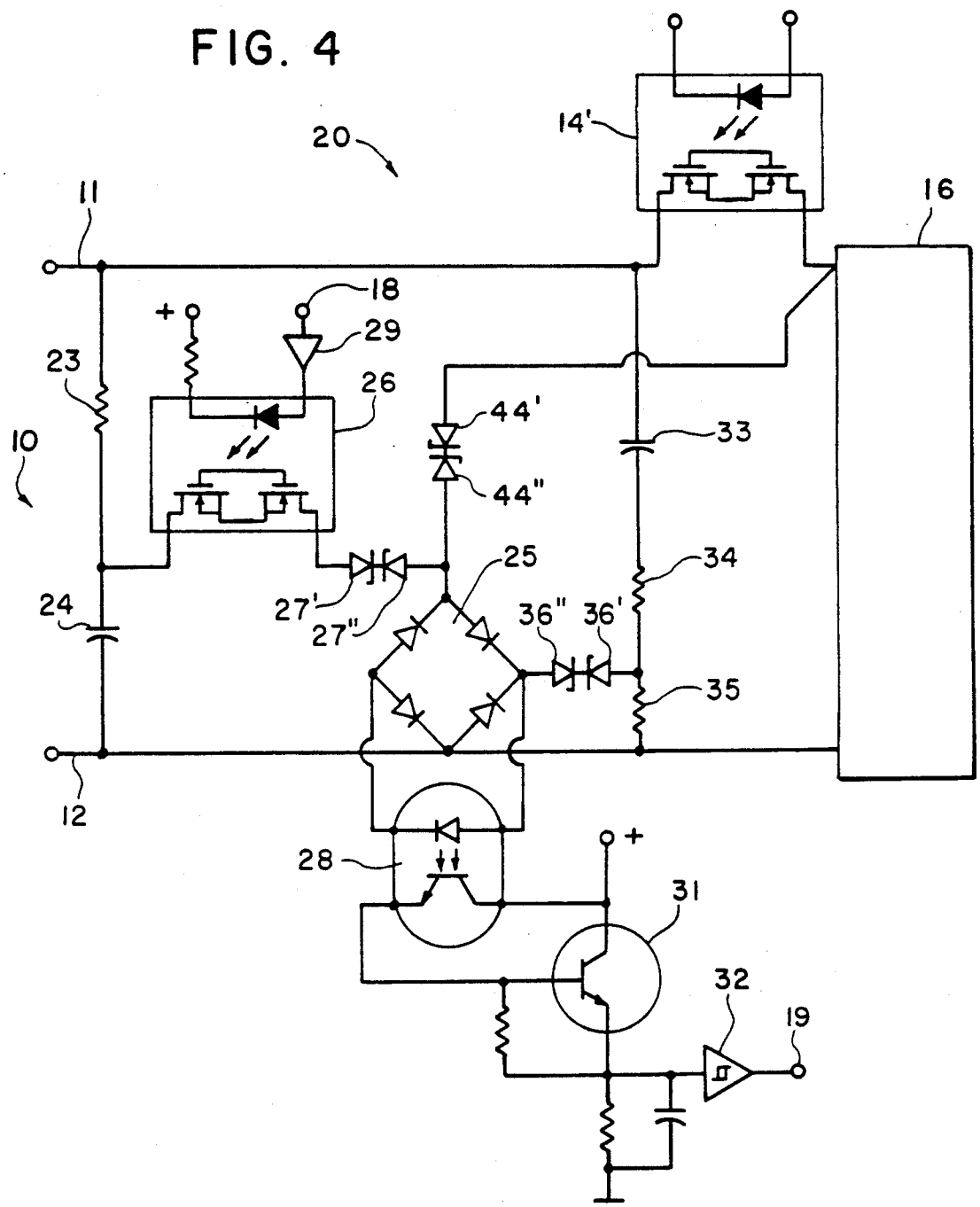
FIG. 4 is a circuit diagram for another preferred embodiment of the invention, including an On-Hook/Off-Hook line state detector, a ring detector, and an overload detector circuit.

FIG. 4 shows a second preferred embodiment of an On-Hook/Off-Hook line state detector according to the invention, plus an overload detection circuit according to the invention, and a ring detector circuit. A single pole analog switch 14' is shown as Off-Hook switch for a modem device 16, which includes the data circuits 17 of FIG. 1, while other contacts in relay 14 of FIG. 1 have been omitted to make the illustration simple.

The On-Hook/Off-Hook line state detector circuits of FIG. 4 uses a capacitor 24 to convert a very small charging current into a substantial current in the sensing circuit according to the invention, as explained in connection with FIG. 2 above, but it differs from the circuits of FIGS. 2 and 3 in that only the sensing circuit of opto-coupler 28 is connected to the DC side of rectifier bridge 25, while two zener diodes 27' and 27" are connected in series opposition to form a bipolar zener device in the sensing circuit on the AC side of rectifier bridge 25, and a bipolar analog switch 26' is used on the AC side of the bridge 25 to connect the sensing circuit in the opto-coupler 28 to the capacitor 24 during polling.

FIG. 4 further shows a circuit according to the invention for detecting overload conditions that could harm the circuits in a modem device 16 when the Off-Hook switch 14' is closed. Such overload conditions arise when the voltage on the telephone line 10 in off-hook state is higher than 10 volt. The overload detection circuit uses a voltage sensing circuit connected to the input terminals of the modem device 16 after the Off-Hook switch 14'. The voltage sensing circuit shown in FIG. 4 comprises a bipolar zener device 44', 44" in series with a sensing circuit comprising a sensing circuit of an opto-coupler 28 inside the DC terminals of a rectifier bridge 25. A zener voltage of about 10 V in the zener device 44', 44" will make the overload sensing circuit respond to line voltages above 13 V, without any effect on the circuits at normal line voltages. A signal from the output circuit of the opto-coupler 2 is fed to the data circuits in the modem device 16 as indication of overload via buffer circuit 31, 32 and response channel 19. The overload signal will initiate opening of the Off-Hook switch 14', possibly with a time delay, to protect the modem device 16 against long term overheating.

The ring detector circuit of FIG. 4 is equivalent to the ring detector circuit shown in FIG. 3. It uses as sensing element the same opto-coupler 28 as the On-Hook/Off-Hook line state detector, but by connecting only the sensing circuit of the opto-coupler 28 directly inside the DC terminals of rectifier bridge 25, components 37, 38, 40, 41, 42 of FIG. 3 could be eliminated. The single zener diode 36 in the ring detector circuit of FIG. 3 has been replaced in FIG. 4 by two zener diodes 36', 36" in series opposition outside the rectifier bridge 25 in order to provide a bipolar zener device as required on the AC side of rectifier bridge 25.

In FIG. 4 the opto-coupler 28 inside the DC terminals of the rectifier bridge 25 is used as a common sensing element for all the illustrated sensing circuits. It should be obvious, however, that any of the three sensing circuits shown in FIG. 4, for On-Hook/Off-Hook line state, for ring detection, and for overload detection, may be used separately as well as in any combination.

The resistance value of resistor 23 in series with the capacitor 24 need only meet the loading specifications imposed by telephone companies. 5 Mohm is a suitable value for the most demanding telephone authorities today.

The input resistance of the voltage sensing device used to discriminate between high and low capacitor 24 voltage must be low in order to discharge the capacitor 24 quickly, so a large discharge current is obtained. The ratio of the current supplied to the input circuit of the voltage sensing device and the current loading of the On-Hook telephone line via the resistor 23 in series with the capacitor 24 is directly proportional to the resistance value of resistor 23 divided by the input resistance of the voltage sensing device. A large current in the input circuit of the voltage sensing device makes it possible to use inexpensive voltage sensing devices without need for amplification and galvanically isolated power supplies. The preferred voltage sensing circuit, comprising a zener diode 27 in series with the input circuit of an opto-coupler 28, has essentially zero input resistance for voltages above the threshold voltage of the zener diode and other diodes in the circuit, as described above, so it receives a very firm current signal from the capacitor.

Discrimination between low and high voltage need not be made directly by voltage comparison, as described in connection with FIGS. 2, 3 and 4. The sensing circuit can instead include a current sensor capable of discriminating between a high current caused by high voltage, and a lower current caused by low voltage. Such current sensors are known in the art.

The invention does not require any special pulse duration for the polling signal on polling channel 18 for the On-Hook/Off-Hook line state detection. A steady current via polling channel 18 while polling, as well as while relay 14 or switch 14' is closed, is as satisfactory as a short polling pulse.

What is claimed is:
1. Apparatus for determining the state of a telephone line, comprising:
a resistor and a capacitor connected in series across the telephone line, said resistor having a resistance sufficiently large to satisfy loading requirements on a telephone line in an On-Hook state;

a low impedance voltage sensing device; and means for connecting said voltage sensing device across said capacitor in response to a polling signal.

2. Apparatus for determining the state of a telephone line according to claim 1, wherein said low impedance voltage sensing device comprises a sensing circuit in an opto-coupler in series with a zener diode.

3. Apparatus for determining the state of a telephone line according to claim 1, further comprising a rectifier bridge connected effectively between said low impedance voltage sensing device and said capacitor.

4. Method for determining the state of a telephone line, comprising the steps of:

charging a capacitor by the voltage across the telephone line via a resistance sufficiently large to satisfy loading requirements on a telephone line in On-Hook state;

providing a low impedance voltage sensing device having an on-state when a voltage above a predetermined threshold value is sensed;

connecting said low impedance voltage sensing device to said capacitor when the state of the telephone line is to be determined; and using an on-state of said voltage sensing device while said capacitor is connected to the voltage sensing device as indication that the telephone line is in the On-Hook state.

5. Method for determining the state of a telephone line according to claim 4, wherein said low impedance voltage sensing device comprises a zener diode in series with a sensing circuit in an opto-coupler, said opto-coupler having an output circuit indicating an on-state when current is flowing through said sensing circuit.

6. Apparatus for determining the state of a telephone line, comprising:

a modem device for automatic dialing and control of the apparatus;

an Off-Hook switch for connecting said modem device to the telephone line in response to a control signal from said modem device;

means for determining the On-Hook/Off-Hook state of the telephone line, including a resistor and a capacitor connected in series across said telephone line, said resistor having a resistance sufficiently large to be an acceptable load on a telephone line in an On-Hook state;

a voltage sensing device with a low impedance sensing circuit and an output circuit indicating an on-state when the sensing circuit is connected to a voltage above a predetermined threshold level;

a normally open switching device connected across said capacitor in series with said low impedance sensing circuit in said voltage sensing device;

means for closing said switching device in response to a polling signal from said modem device; and means for detecting an on-state in said voltage sensing device coincident with a polling signal.

7. Apparatus for determining the state of a telephone line according to claim 6, wherein said voltage sensing device comprises a zener diode connected in series with a sensing circuit in an opto-coupler.

8. Apparatus for connection to a telephone line according to claim 7, further comprising a rectifier bridge connected effectively between said sensing circuit and said capacitor.

9. Apparatus for connection to a telephone line according to claim 7, further comprising an overload detection circuit connected to the input terminals of said modem device, wherein said overload detection circuit includes said sensing circuit in said opto-coupler.

10. Apparatus for connection to a telephone line according to claim 9, further comprising a ring detector circuit connected to said telephone line, wherein said ring detector circuit includes said sensing circuit in said opto-coupler.

11. Modem device connected to a telephone line via an Off-Hook switch, comprising:

means for protecting the modem device from an overload condition, including a voltage sensing device comprising an opto-coupler having a sensing circuit and an output circuit with an on-state when current is flowing in the sensing circuit, and a zener diode connected in series with said sensing circuit;

means for effectively connecting said sensing circuit in series with said zener diode across input terminals of the modem device;

means responsive to an on-state in said output circuit coincident with an Off-Hook state of the Off-Hook switch for switching the Off-Hook switch to an On-Hook state; and a ring detector circuit connected to the telephone line, and including said sensing circuit in said opto-coupler.

* * * * *